United States Patent
Oten et al.

(10) Patent No.: US 7,508,430 B1
(45) Date of Patent: Mar. 24, 2009

(54) METHOD FOR LOCALLY REDUCING ROW NOISE

(75) Inventors: Remzi Oten, Santa Clara, CA (US); Jim Li, San Jose, CA (US)

(73) Assignee: Magnachip Semiconductor, Ltd., Cheongju-si (KR)

( * ) Notice: Subject to any disclaimer, the term of this patent is extended or adjusted under 35 U.S.C. 154(b) by 759 days.

(21) Appl. No.: 11/061,349

(22) Filed: Feb. 18, 2005

(51) Int. Cl.
*H04N 9/64* (2006.01)
*H04N 5/00* (2006.01)
*G06K 9/38* (2006.01)

(52) U.S. Cl. .................. 348/242; 348/615; 348/621; 382/272

(58) Field of Classification Search .............. 348/241, 348/242, 251, 273, 607, 615, 619, 621; 382/272, 382/275; 358/463
See application file for complete search history.

(56) References Cited

U.S. PATENT DOCUMENTS

| 4,783,840 | A | * | 11/1988 | Song ........................... 382/261 |
| 4,975,864 | A | * | 12/1990 | Sendall et al. ............... 382/275 |
| 5,471,240 | A | * | 11/1995 | Prager et al. ................. 348/164 |
| 6,646,681 | B1 | * | 11/2003 | Macy et al. .................. 348/241 |
| 6,718,069 | B2 | * | 4/2004 | Mollov et al. ................ 348/620 |
| 7,084,912 | B2 | * | 8/2006 | Chieh ........................... 348/245 |
| 2006/0192864 | A1 | * | 8/2006 | Mauritzson .................. 348/241 |

* cited by examiner

*Primary Examiner*—John M Villecco
(74) *Attorney, Agent, or Firm*—DLA Piper LLP US

(57) ABSTRACT

A method for reducing the row noise from complementary metal oxide semiconductor (CMOS) image sensor by using a local offset correction is disclosed. The method operates on sensor with and without a Color Filter Array (CFA) before any interpolation is applied and estimates the local offset by comparing the rows in a local window. The method also reduces the pixel-to-pixel noise while reducing the row noise.

8 Claims, 4 Drawing Sheets

| R | G | R | G | R | G | R | G | R | G |
|---|---|---|---|---|---|---|---|---|---|
| G | B | G | B | G | B | G | B | G | B |
| R | G | R | G | R | G | R | G | R | G |
| G | B | G | B | G | B | G | B | G | B |
| R | G | R | G | R | G | R | G | R | G |
| G | B | G | B | G | B | G | B | G | B |
| R | G | R | G | R | G | R | G | R | G |

Figure 1

METHOD FOR LOCALLY REDUCING ROW NOISE

BACKGROUND

1. Field

This invention relates to the field of digital image processing, particularly the reduction of row noise in CMOS image sensors.

2. Related Art

Complementary Metal Oxide Semiconductor (CMOS) image sensors suffer from row noise that is usually due to the random noise that shifts the voltage level(s) in Analog-to-Digital Converter (ADC) and is a well know problem within the field of digital imaging. The shift in voltage level affects the ADC slope and ADC output by creating an offset consistent in the entire row of pixels. Row noise is seen as randomly distributed horizontal lines that appear to be relatively darker or lighter than the surrounding background. The noise becomes much more apparent to the eye due to the high correlation of pixels along the horizontal.

In U.S. patent (U.S. Pat. No. 6,646,681 B1) Macy, this problem is attacked by a row-by-row based offset correction mechanism. This method estimates the offset caused by random level shifts in the ADC converter by passing through the entire row and the several rows above and below to collect statistics as depicted in FIG. 1. After collecting statistics and estimating an appropriate offset, the mechanism attempts to correct for the row noise by adding the same offset to every pixel in the row. Although this method can be effective in certain scenarios, there are several severe problems associated with reducing row noise on a row-by-row basis.

Row noise reduction based on row-by-row correction is very sensitive to the errors in the estimation of the offset. Since the estimated offset is determined for an entire row at a time the possibility for visible image defects and error is increased. The estimation of the offset is susceptible to characteristics of other noise possibly present and the content of the scene being imaged. Any error will look noticeably worse because of the linear correlation of the corrected pixels and the human eyes tendency to impose linear patterns onto a image.

In addition to its high-sensitivity to offset estimation error, the row-by-row method of row-noise correction has several other significant drawbacks associated with a CMOS imager design, operation and image quality. Such row-noise reduction methods require that the entire row of pixels be stored in memory during a statistical analysis step thus increasing the amount of physical memory required, the time spent processing the data and the cost to manufacture. Since a row-by-row method passes all lines and pixels of a sensor as if they have uniform color response, it is inappropriate for use with CMOS sensors with Color Filter Arrays (CFA). CFAs, such as the so-called Bayer pattern, pass only one color at each pixel. Since most image sensors have a higher sensitivity to red light than to green or blue light, the response of a pixel with a red filter will be much higher than that of a pixel with a either a blue or green filter even if there is an equal level of red and blue/green signal. Due to this drawback, row-by-row noise correction can only be applied after an interpolation or demosaic step that can dramatically change the statistics required to estimate the offset.

SUMMARY

A method for reducing row noise in complementary-metal-oxide-semiconductor (CMOS) image sensors is disclosed. Row noise offset is determined on a pixel-by-pixel basis by collecting statistics within a two-dimension region surrounding a central pixel. This methodology provides for two main advantages over determining row noise offset on a row-by-row basis; reduction of required on chip memory and reduction of sensitivity to offset estimation. The reduced requirement of on chip memory can lower the overall cost to produce the image sensor and the reduced sensitivity to offset estimation improves image quality by reducing the apparent correlation of row noise.

BRIEF DESCRIPTION OF DRAWINGS

FIG. 1 is a diagram of a 2 dimensional region of pixels used for estimating the offset of a central pixel as implemented in one embodiment of the current invention.

DETAILED DESCRIPTION

The current invention, in contrast to the row-by-row method of row-noise correction, compensates for row noise on a pixel-by-pixel basis using a two dimensional (2D) region of pixels surrounding each pixel from which to gather statistics. By working on a pixel-by-pixel basis, the current invention is effective on sensors with and without Color Filter Arrays (CFA's). In the case of a sensor with a CFA, the raw pre-interpolation data of one or more color components is surveyed to gather statistics from which offset estimates can be made. In one embodiment of the current invention, the Green channel data of a Bayer Pattern CFA, as depicted in FIG. 1, is used to estimate the offsets. Optionally, it is possible to use any of the other color channels regardless of the CFA pattern, however it is preferable to use a channel that is present in every row. In the case of a Bayer Pattern CFA, the Green channel is present on every line.

According to one embodiment of the current invention, a 2u+1 pixel by 2v+1 pixel region is defined around each pixel, thus alleviating the need to store the entire row of data in a line buffer. In FIG. 1, u=2, and v=3 which makes the region 5 pixels by 7 pixels. Since an appropriate offset in applied to a single pixel at a time, each correction is independent of each other, thus reducing the sensitivity to errors in offset estimation and the visual linear correlation that can occur with a row-by-row method of row noise correction. Optionally, the corrections can be made to two pixels at a time. In the case of a Bayer Pattern CFA it is often desirable to apply the offset of the Green channel pixel to a neighboring Blue or Green channel pixel. Although any color channel can be used, there is often more signal in the Green channel due to the nature of both natural and commercial light sources. It is contemplated, that the color channel used for gathering statistics within the 2D region of pixels can be specific for certain situations in which the color temperature of the light source or scene skews the signal distribution more towards the blue or red. In such specialized scenarios, the CFA pattern and color used for statistical analysis can change. For example, if a desired scene or situation is illuminated by a light source that is predominately red, then it is desirable to use a CFA more sensitive to red and accordingly use the Red channel data to estimate the correction offset. Similarly, the Blue or some other channel available, such as one used in a four color CFA, can be used to obtain the best results depending on the lighting scenario and CFA configuration. In addition to effectively eliminating the row noise, the methods of the current invention are also effective in reducing the pixel-to-pixel noise often present in CMOS sensors.

Figure 2:
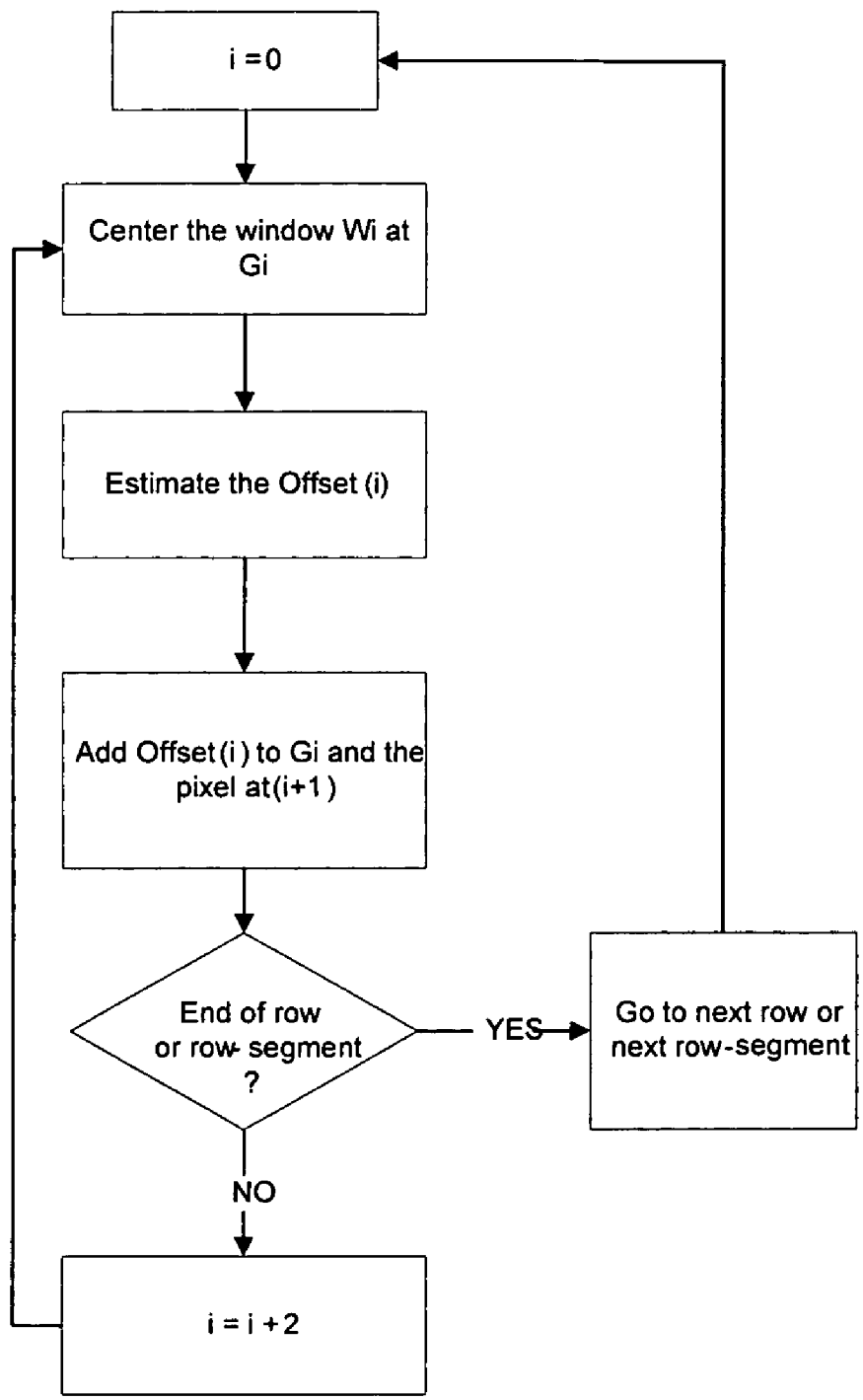
FIG. 2 is flowchart according to one embodiment of the current invention.

In one embodiment of the current invention as depicted FIG. 2, the algorithm for collecting statistics goes through all the Green pixels, $G_i$, on the sensor one by one. As each pixel is surveyed, the 2u+1 pixel by 2v+1 pixel region $W_i$ surrounding Gi, located at (u+1, v+1), is also defined. According to one embodiment of the current invention the 'offset estimation' step of the algorithm in FIG. 2 is as follows: First, the average, $A_{line}(i)$, of the Green pixels in the middle row of $W_i$ containing $G_i$ is found. Then the average of the all Green pixels in the region, $W_i$: $A_{window}(i)$ is found. The estimated offset for Wi is calculated as:

$$Offset(i) = A_{window}(i) - A_{line}(i).$$

Once the estimated offset is calculated, it is applied to the $G_i$ and the pixel at (i+1). In FIG. 1, the pixel at (i+1) is the B (Blue) pixel. Therefore, the only two pixel updates in window Wi will be as follows:

$$G_i = G_i + Offset(i)$$

$$B_{(i+1)} = B_{(i+1)} + Offset(i)$$

In one embodiment of the current invention the algorithm for estimating the offset for each pixel first finds the averages of Green pixels in each row separately inside the region Wi, i.e. $A_1, \ldots, A_{(2u+1)}$, where $A_1$ is the average of Green pixels in the top row of Wi, and $A_{(2u+1)}$ is the average of Green pixels at the bottom row of the Wi. Then the median, Md(i), of $A_1, \ldots, A_{(2u+1)}$ values is found.

$$Md(i) = median(A_1, \ldots, A_{(2u+1)})$$

The offset is then estimated to be:

$$Offset(i) = Md(i) - A_{(u+1)}(i)$$

Once the estimated offset is calculated, it is applied to the $G_i$ and the pixel at (i+1) as described above.

Figure 3:
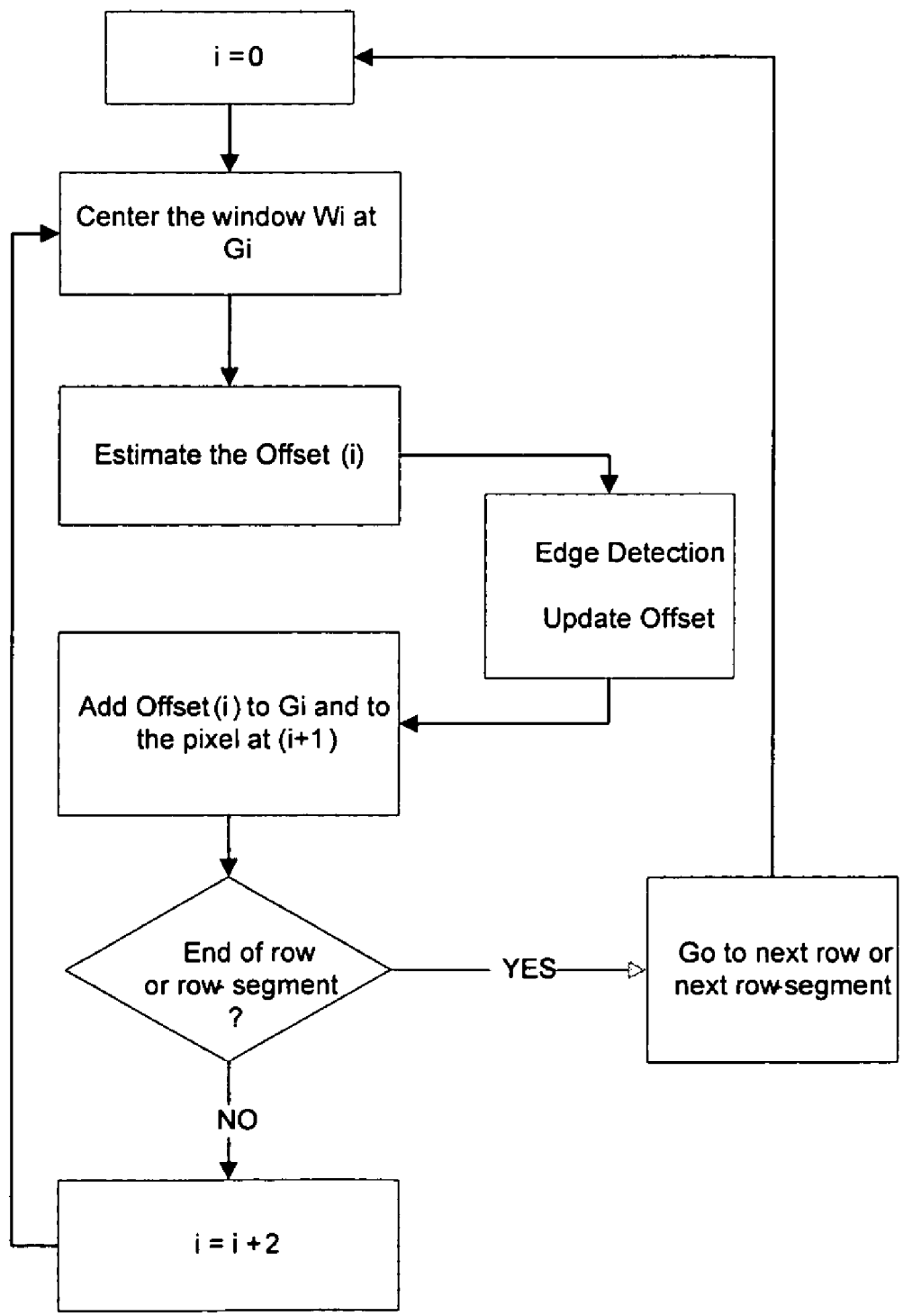
FIG. 3 is a flowchart according to one embodiment of the current invention.
Figure 4:
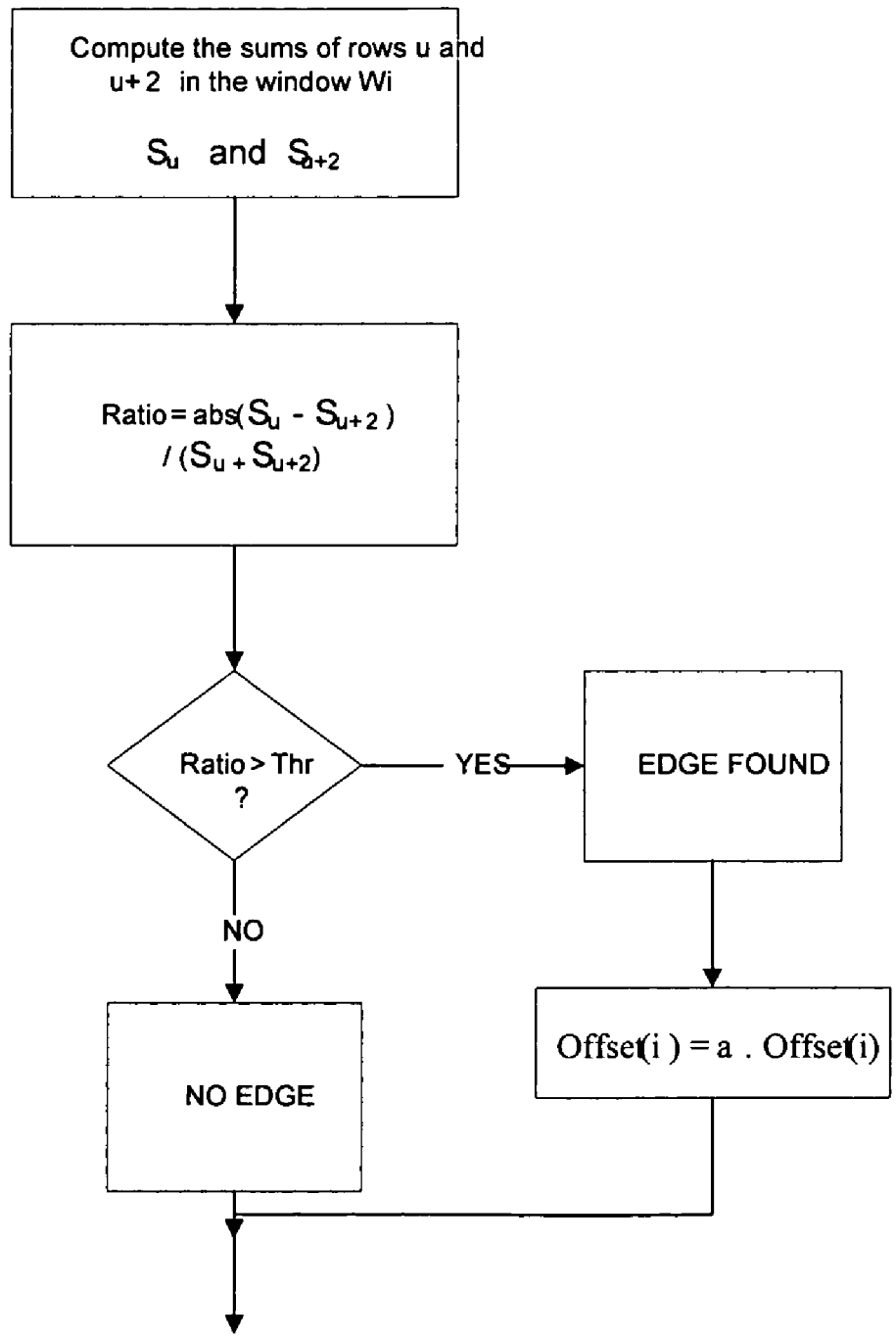
FIG. 4 is a flowchart according to one embodiment of the current invention.

In one embodiment of the current invention an additional "Edge Detection Step and Offset Update" step is added after the algorithm for estimating the offset of each pixel as depicted in FIG. 3. The edge detection step detects whether the pixel $G_i$ is located on a horizontal edge or within a high frequency content region of a scene or not. There are many different edge detection algorithms that can be applied here; however, one of the simplest algorithms is useful for illustration of such an edge detection routine. As depicted in FIG. 4, the sums $S_u$ and $S_{u+2}$ of Green pixels in rows u and u+2 within region $W_i$ are found separately. If $|S_u - S_{u+2}|/(S_u + S_{u+2})$ is greater than a predetermined threshold characteristic of a particular sensor in a particular state, then Gi sits on a horizontal edge of the imaged scene. The threshold values can be determined offline by deriving the statistics of the edges vs. row noise offset. If the edge is detected then the algorithm updates the Offset(i) by multiplying it by a coefficient α.

$$Offset(i) = \alpha * Offset(i)$$

Where α is a predetermined value that controls the blur at the edges. Setting α to zero will leave the Gi and the pixel at (i+1) as they are.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

We claim:

1. A method for reducing row noise in image sensors, comprising:
   defining a region $W_i$ centered on pixel $P_i$ of the $i^{th}$ column;
   estimating $Offset_i$ on the basis of pixels within the region $W_i$; and
   adding $Offset_i$ to the signal of pixel $P_i$,
   wherein $W_i$ is a 2 dimensional region of odd number of pixels long and wide, a number of pixels in a row within the region $W_i$ being less than all pixels in the row.

2. A method for reducing row noise in image sensors, comprising:
   defining a region $W_i$ centered on pixel $P_i$ of the $i^{th}$ column;
   calculating $A_{region}(i)$, the average of the pixels in the row within region $W_i$ containing $P_i$;
   calculating $A_{region}(i)$, the average of all the pixels in region $W_i$;
   calculating $Offset_i$ by subtracting $A_{line}(i)$ from $A_{region}(i)$; and
   adding $Offset_i$ to the signal of pixel $P_i$,
   wherein $W_i$ is a 2 dimensional region of odd number of pixels long and wide.

3. A method for reducing row noise in image sensors, comprising:
   defining a region $W_i$ centered on pixel $P_i$ of the $i^{th}$ column;
   calculating, for each row inside region $W_i$, the average pixel value $A_{line}(i)$, being an integer ranging between 1 and 2 u+1, u being an integer;
   calculating Md(i), the median value of all the average pixel row values;
   calculating $Offset_i$ by subtracting $A_{line}(u+1)$ from Md(i); and
   adding $Offset_i$ to the signal of pixel $P_i$,
   wherein $W_i$ is a 2 dimensional region of odd number of pixels long and wide.

4. The method of claims 1, 2, or 3 further comprising;
   adding $Offset_i$ to the signal of one or more pixels immediately adjacent to pixel $P_i$.

5. The method of claim 4, wherein:
   the pixel $P_i$ comprises a green pixel, the one or more pixels immediately adjacent to pixel $P_i$ comprising at least one of a blue and a green pixel neighboring the pixel $P_i$.

6. The method of claims 1, 2, or 3 further comprising;
   detecting whether or not pixel $P_i$ is located on a horizontal edge of an image; and
   updating $Offset_i$ if $P_i$ is located on a horizontal edge of the image.

7. The method of claim 6 wherein the detecting step further comprises the steps of;
   calculating the sum, $S_j$, of signals for pixels in row j of the sensor;
   calculating the sum, $S_{j+2}$, of signals for pixels in row j+2 of the sensor;
   calculating the absolute value of the difference between $S_j$ and $S_{j+2}$;
   determining the ratio, $R_{j+1}$, of the absolute value of the difference between $S_j$ and $S_{j+2}$ and the sum of $S_j$ and $S_{j+2}$; and,
   determining whether $R_{j+1}$ is greater than some predetermined threshold value whereby pixel $P_i$ would likely lie on a horizontal edge of the image.

8. The method of claim 6 further comprising;
   adding $Offset_i$ to the signal of one or more pixels immediately adjacent to pixel $P_i$.

* * * * *